United States Patent [19]

Nagata et al.

[11] Patent Number: 5,945,184
[45] Date of Patent: Aug. 31, 1999

[54] AIR BAG FOR AIR BAG APPARATUS

[75] Inventors: Norinari Nagata, Aichi; Yuji Kuriyama, Gifu; Shinichi Imazu; Ikuo Yamada, both of Aichi, all of Japan

[73] Assignee: Toyoda Gosei Co., Ltd., Aichi-ken, Japan

[21] Appl. No.: 08/852,124

[22] Filed: May 6, 1997

[30] Foreign Application Priority Data

May 7, 1996 [JP] Japan ..................................... 8-112815

[51] Int. Cl.⁶ ................................................. B60R 21/16
[52] U.S. Cl. .................... 428/35.2; 428/35.5; 428/36.1; 428/194; 428/195; 280/728.1; 280/743.2
[58] Field of Search .................... 428/35.2, 36.1, 428/36.2, 195, 196, 197, 355, 193, 194; 280/728.1, 743.1, 743.2

[56] References Cited

U.S. PATENT DOCUMENTS

| | | | |
|---|---|---|---|
| 5,240,283 | 8/1993 | Kishi et al. | 280/743.1 |
| 5,333,903 | 8/1994 | Eyrainer et al. | 280/743.1 |
| 5,427,410 | 6/1995 | Shiata et al. | 280/743.1 |
| 5,464,250 | 11/1995 | Sato | 280/743.1 |
| 5,593,179 | 1/1997 | Maruyama | 280/743.2 |
| 5,791,685 | 8/1998 | Lachat et al. | 280/743.1 |

FOREIGN PATENT DOCUMENTS

| | | |
|---|---|---|
| 0 593 172 | 4/1994 | European Pat. Off. . |
| 6-191370 | 7/1994 | Japan . |

*Primary Examiner*—Rena L. Dye
*Attorney, Agent, or Firm*—Pillsbury Madison & Sutro LLP

[57] ABSTRACT

An air bag has an air bag main body and a sheet. The air bag main body is formed into such a sac like shape as having a circumferential wall portion that extends in a sleeve-like form from a peripheral edge of an opening and a bottom wall portion that closes the circumferential wall portion. The sheet is arranged so as to extend from the peripheral edge of the opening to the bottom wall portion via the circumferential wall portion in such a manner that the air bag main body is split into two parts, and the sheet has a communicating hole. The sheet in sewn only to a portion of the peripheral edge of the opening in the circumferential wall portion and to a portion of the bottom wall portion.

5 Claims, 5 Drawing Sheets

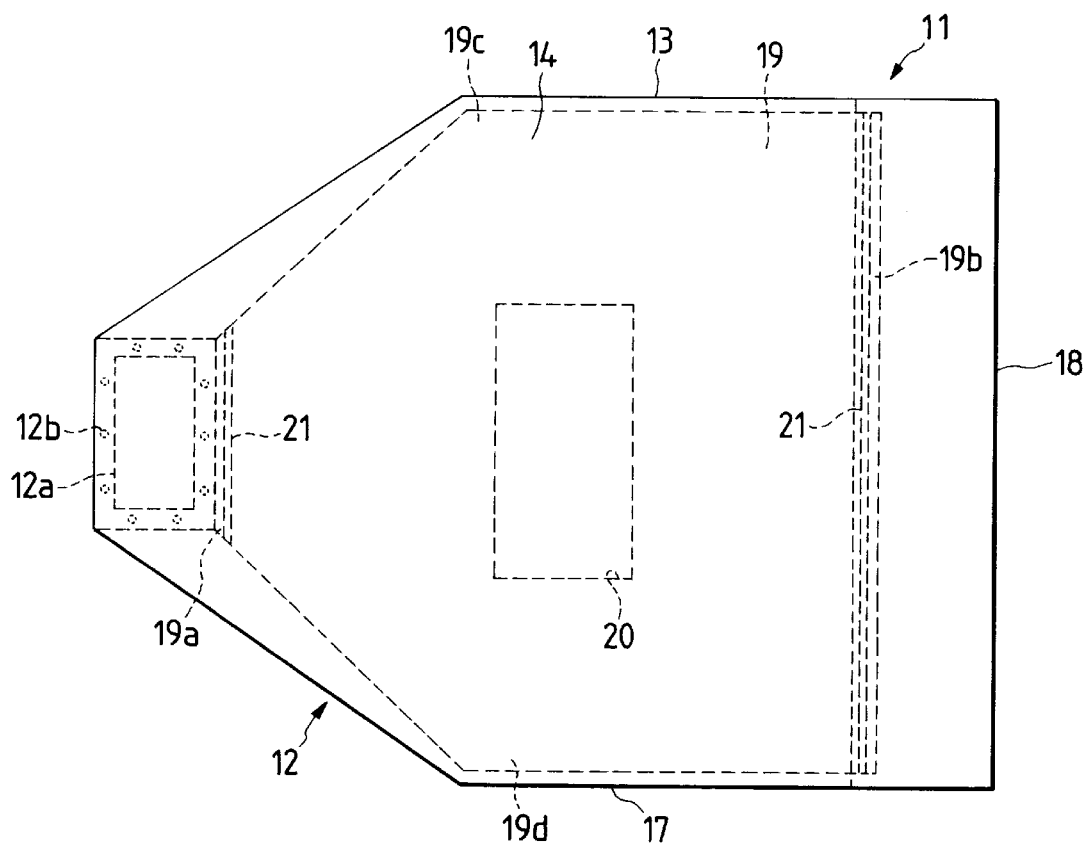
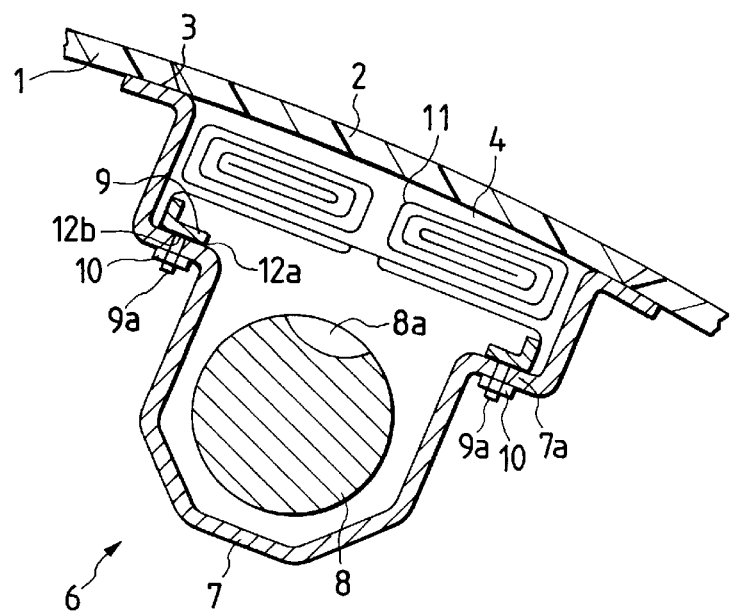

FIG. 4(a)
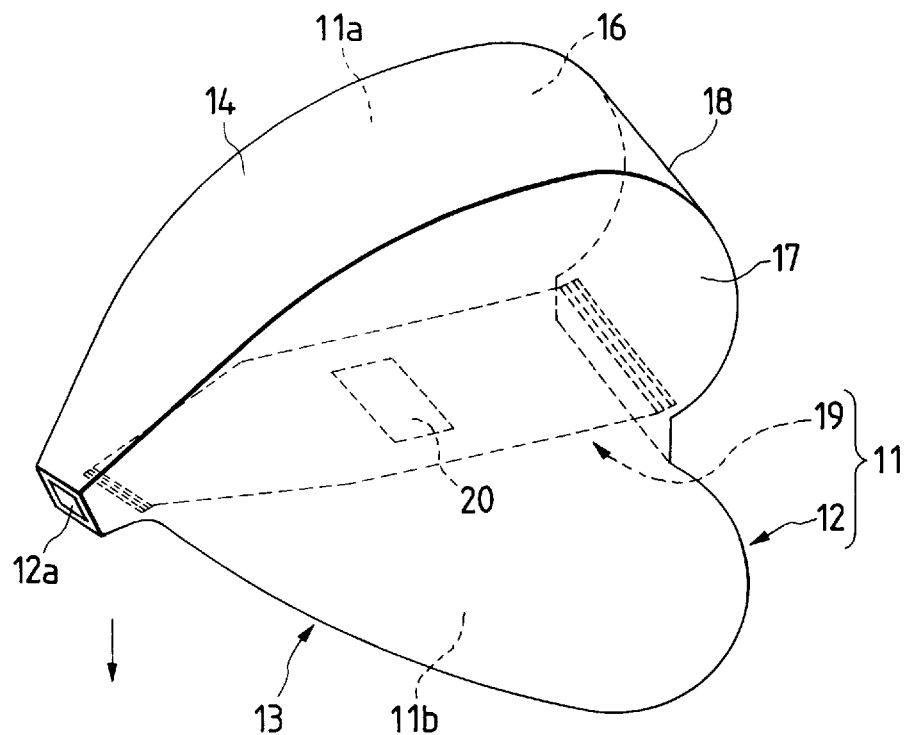
FIG. 4(b)
FIG. 4(c)
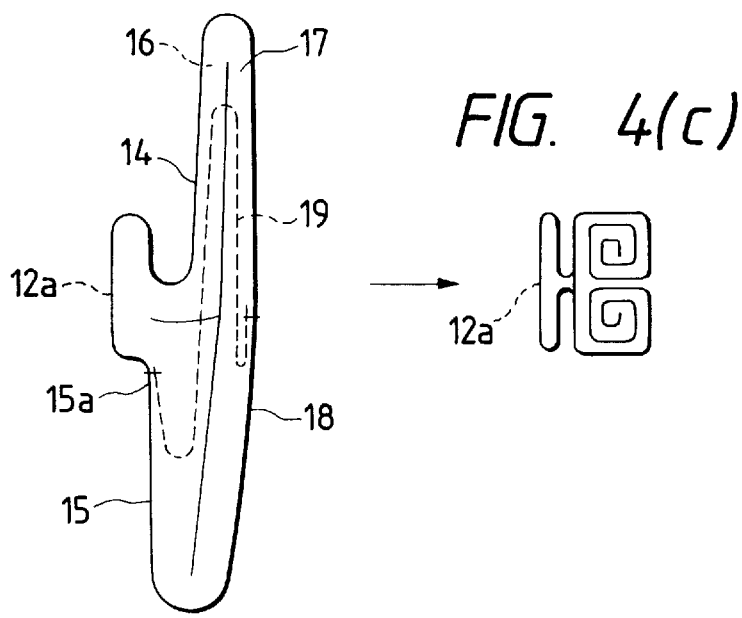

AIR BAG FOR AIR BAG APPARATUS

BACKGROUND OF THE INVENTION

1. Field of the Invention

The present invention relates to an air bag apparatus disposed in an instrument panel arranged in front of the passenger's seat in a vehicle. More particularly, the present invention is directed to an air bag that has a sheet for splitting the inside of a sac-like air bag main body into a plurality or chambers, the sheet having a communicating hole.

2. Description of the Related Art

An air bag employing a sheet that splits a sac-like air bag main body into two chambers and that has a communicating hole has been disclosed in Japanese Patent Publication No. Hei. 6-191370. An air bag of this type is characterized in that not only inflation of the air bag can be completed quickly but also reduces the instantaneous moving speeds of the parts of the air bag up to the completion of inflation.

However, in the air bag disclosed in the aforementioned publication, the sheet is sewn to the inner circumferential surface of the air bag main body all along the periphery of the sheet.

In some cases the air bag main body has a sac-like shape with a circumferential wall portion that extends in a sleeve-like form from the peripheral edge of an inflating gas introducing opening to a bottom wall portion that closes the circumferential wall portion. If the entire periphery of such a sheet is sewn to the air bag main body from the peripheral edge of the opening to the bottom wall portion via the circumferential wall portion, the seam between the circumferential wall portion and the sheet wrinkles and becomes bulky at the time of folding the air bag and placing the folded air bag in the air bag apparatus. As a result, the air bag is hard to fold into a compact form.

In addition, since the sheet must be sewn all along the periphery thereof, the sewing operation is time-consuming, which in turn increases the number of manufacturing steps and air bag manufacture costs.

SUMMARY OF THE INVENTION

The present invention overcomes the aforementioned problems. The object of the present invention is, therefore, to provide an air bag for an air bag apparatus that can be folded into a compact form yet reduces the number of manufacturing steps and the cost of manufacture.

The air bag according to the present invention is characterized as allowing the sheet to be sewn only to the peripheral edge of the opening in the air bag main body circumferential wall portion and to the bottom wall portion. Therefore, the sheet is not united to the majority of the circumferential wall portion.

During folding of the air bag, the degree to which the sheet regulates the folding shape of the circumferential wall portion of the air bag main body is reduced, which in turn reduces the chance of wrinkling the circumferential wall portion. As a result, the air bag can be folded in a compact form.

Moreover, the sheet is sewn only to the peripheral edge of the opening in the circumferential wall portion and to the bottom wall portion of the air bag main body, i.e., the sheet is not sewn all along the periphery thereof as in the conventional example. Therefore, the number of sewing operation stops and the cost of the sewing operation can be reduced, and the number of manufacturing steps and manufacturing costs are also reduced.

BRIEF DESCRIPTION OF THE DRAWINGS

In the accompanying drawings:

FIG. 2 is plan view thereof with the air bag inflated;

FIG. 3 is sectional view of the air bag apparatus of FIG. 1 where the air bag is folded;

FIG. 4 (*a*) to 4(*c*) are diagrams illustrative of how the air bag, according to the embodiment shown in FIG. 1, is folded.

DETAILED DESCRIPTION OF THE PREFERRED EMBODIMENTS

The preferred exemplary embodiments of the present invention will now be described with reference to the drawings.

Figure 1:
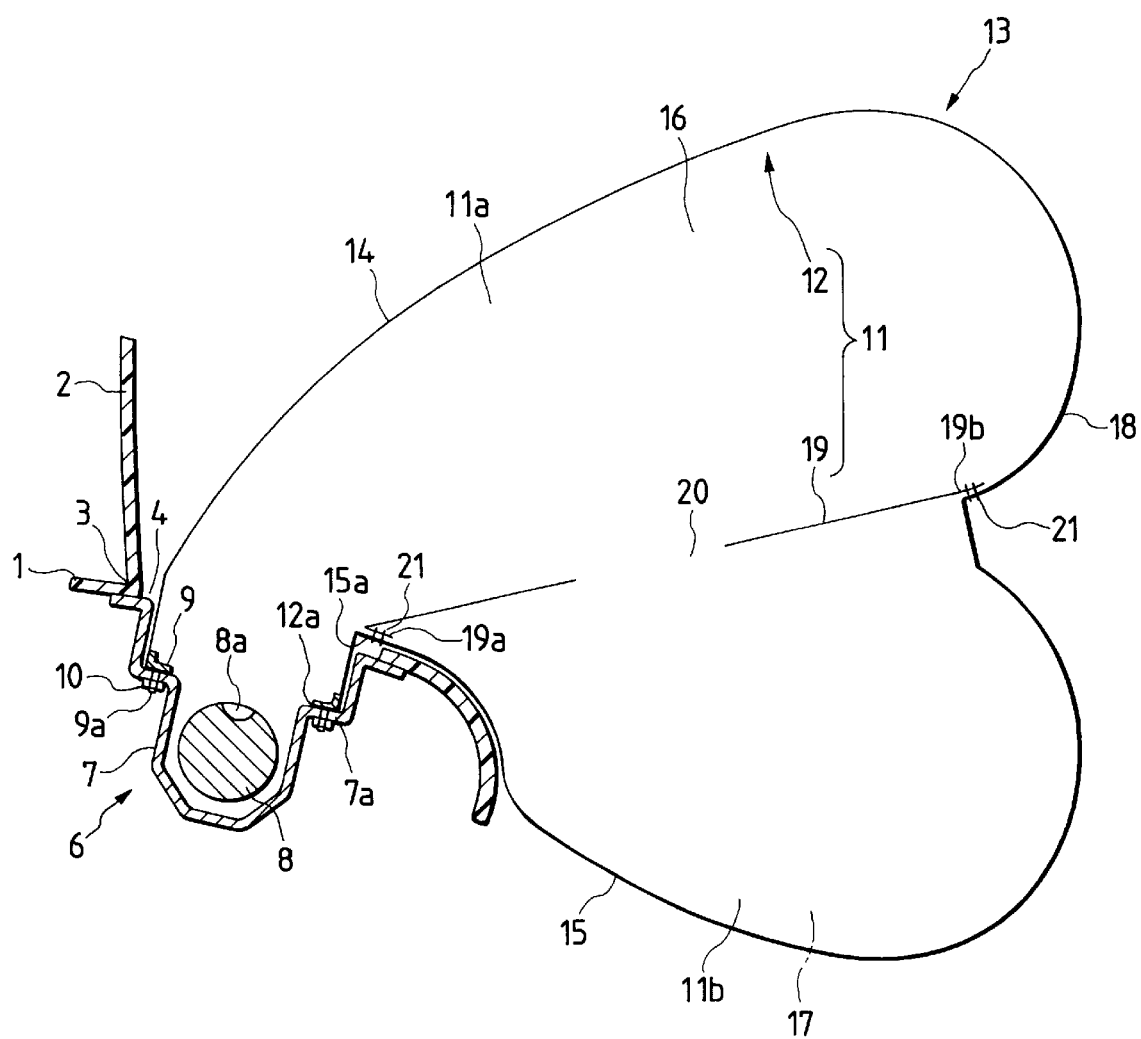
FIG. 1 is a cross-sectional view of one embodiment of an inflated air bag according to the present invention.

An air bag 11, according to a first embodiment, is shown in an air bag apparatus 6 for a passenger's seat, the air bag being disposed at an instrument panel 1 in front of the passenger's seat of a vehicle as shown in FIGS. 1 to 3. The instrument panel 1 has a door 2 that is formed by a weakened tear seam extending about the periphery thereof. The door 2 can be opened about an unweakened hinge portion 3 upon inflation of the air bag 11.

The air bag apparatus 6 is disposed below the door 2 of the instrument panel 1, and includes, in addition to a folded air bag 11, an inflator 8, for example, of a cylinder type, with a gas jetting port 8*a* for supplying inflating gas into the folded air bag 11, and a case 7 that holds the folded air bag and the inflator 8.

The case 7 is formed with a boxlike body, such as a substantially rectangular parallelepiped with a quadrilateral ring-like stepped surface 7*a*. The case 7 can be made of a variety of materials, including a metal plate, and the inflator 8 is attached thereto by taking advantage of predetermined confronting side walls. Further, a plurality of through holes (reference numerals are omitted but such holes are shown in phantom in FIG. 2) are formed in the stepped surface 7*a*. Such through holes allow a plurality of bolts 9*a*, extending from a quadrilateral ring-like retainer 9, to permit mounting of the air bag 11.

The air bag 11 is attached using the retainer 9 by pressing the peripheral edge of an opening 12*a* of the air bag 11, which will be described later, with the retainer 9. Bolts 9*a* are inserted into the peripheral edge about the opening 12*a* and the stepped surface 7*a* and fixed in place with nuts 10. That is, by clamping the peripheral edge of the opening 12*a* between the retainer 9 and the stepped surface 7*a*, the air bag 11 is positively attached to case 7.

Further, a bracket (not shown) can be arranged between the case 7 and the frame of the vehicle which is below the instrument panel 1.

As shown in FIGS. 1, 2, 4, the air bag 11 includes: a sac-like air bag main body 12; and an internal sheet 19 that splits the main body 12 into two portions, an upper chamber 11*a* and a lower chamber 11*b*. The air bag main body 12 and the sheet 19 are each made of a fabric that is formed by arranging a desired heat-resistant coating layer on a woven material using a synthetic fiber yarn, such as a polyamide or polyester yarn.

The air bag main body 12 includes a circumferential wall portion 13, that extends in a substantially rectangular sleeve like form from the peripheral edge of the rectangular opening 12a, and a bottom wall portion 18 that closes the circumferential wall portion 13. The opening portion 12a serves as a port for introducing inflating gas from the inflator 8, and in the peripheral edge thereof are through holes 12b that allow the bolts 9a of the retainer 9 to be inserted therethrough. Further, the circumferential wall portion 13 includes a side wall portion 14 arranged on the upper side of the main body 12, a side wall portion 15 arranged on the lower side of the main body 12, and side wall portions 16, 17 that are arranged on both left and right sides of the main body 12.

In this embodiment, the air bag main body 12 is formed so that the side wall portion 14, the bottom wall portion 18, and the side wall portion 15 are formed of a single piece of fabric. Two pieces of fabric are used to form the side wall portions 16, 17 and are sewn to the aforementioned single fabric. It may be noted that the sheet 19 is sewn to the side wall portion 15 and the bottom wall portion 18 before the side wall portions 16, 17 are sewn.

The sheet 19 has a communicating hole 20 therethrough having a rectangular opening in the vicinity of the middle thereof, and the sheet 19 extends from the peripheral edge of opening 12a to the bottom wall portion 18 via the circumferential wall portion 18 in such a manner that the main body 12 is split into the upper chamber 11a and the lower chamber 11b. The sheet 19, which is substantially hexagonal as viewed from top, is sewn to the main body 12 at a front side end portion 19a and a rear side end portion 19b of the vehicle. That is, the front side end portion 19a is sewn to a front portion 15a adjacent the peripheral edge of the opening 12a in the lower side wall portion 15 in the direction of width with a sewing yarn 21, and the rear side and portion 19b is sewn to the bottom wall portion 18 in the direction of width with the sewing yarn 21. It may be noted that end portions 19c, 19d on both left and right sides of the sheet 19 are brought close to the side wall portions 16, 17 when the end portions 19a, 19b have been sewn.

As shown in FIGS. 4 (a) and 4 (b), the air bag 11 is folded in the following manner. First, the side wall portion 14 of the circumferential wall portion 13 is folded, and the peripheral edge of the opening 12a is brought close to the bottom wall portion 18 by further folding the side wall portions 16, 17 inwardly so as to be mutually recessed.

Then, as shown in FIG. 4 (c), the upper and lower end portions of the bottom wall portion 18 are folded by rolling them toward each other, so that the air bag 11 is folded up into the form shown in FIG. 4(a).

Sheet 19 is sewn only to the front portion 15a adjacent the peripheral edge of the opening 12a of the side wall portion 15 in the circumferential wall portion 13 of the air bag main body 12 and to the bottom wall portion 18 of the air bag main body 12. Sheet 19 is not united to the side wall portion 16, 17 of the circumferential wall portion 13 at the time of folding the air bag 11.

As a result, when the air bag 11 is folded in such a manner that the peripheral edge of the opening 12a is brought closer to the bottom wall portion 18, the sheet 19 bends freely, so that the side wall portions 16, 17 of the circumferential wall portion 13 can be folded inwardly with fewer wrinkles and without being interfered with by the sheet 19. Accordingly, the air bag 11 can be folded in a compact form with the succeeding rolling making a neatly arranged assembly.

In contrast, conventional air bags have the end portions 19c, 19d of an interior sheet 19 sewn to the side wall portions 16, 17 of the circumferential wall portion 13. In such a conventional air bag the side wall portions 16, 17 have a number of wrinkles to be pulled by force at this part of fold. Therefore, the conventional air bag becomes bulky when folded by a rolling operation.

In the case of the aforementioned mode of embodiment, it may be noted that the retainer 9 is placed within the air bag 11 and that the bolts 9a are set to project from the through holes 12b in advance when the air bag 11 is to be folded.

Then, when the air bag 11 has been folded, the folded air bag 11 is put in the case 7 with the inflator 8 already attached thereto in such a manner that the bolts 9a project from the stepped surface 7a, and the bolts 9a are thereafter fixed with the nuts 10. As a result, the air bag 11 can be attached to the case 7, and the air bag apparatus 6 has been assembled.

Thereafter, the case 7 can be coupled to the frame of the vehicle so that the air bag apparatus 6 is installed at a predetermined position on the vehicle.

After being installed on the vehicle, when inflating gas is jetted out of the gas jetting port 8a of the inflator 8, the air bag 11 inflates, opens the door 2, and swells out from the resulting opening 4.

At the time of inflation, the upper chamber 11a of the air bag 11 inflates first. The inflating gas then flows toward the lower chamber 11b through the communicating hole 20 of the sheet 19 and through the spaces between the end portions 19c, 19d of the sheet 19 and the side wall portions 16, 17 of the air bag main body circumferential wall portion 13, so that the lower chamber 11b inflates. Hence, the whole air bag 11 is inflated completely.

Further, at the time of inflation, the sheet 19 plays the role of regulating the projecting amount of the air bag 11, since the sheet 19 is sewn to both the side wall front portion 15a adjacent the peripheral edge of the opening 12a and the bottom wall portion 18.

As described above, the air bag 11 of this first embodiment is characterized as allowing the sheet 19 to regulate the folding shape of the side wall portions 16, 17 of the circumferential wall portion 13 of the air bag main body 12 to a lesser degree at the time of folding the air bag 11. Consequently, occurrence of wrinkles in the side wall portions 16, 17 is controlled, so that the air bag 11 can be folded in a compact form.

Further, the sheet 19 in sewn only to the side wall front portion 15a of the peripheral edge of the opening 12a in the circumferential wall portion 13 of the air bag main body and to the bottom wall portion 18; i.e., the sheet 19 is not sewn all along the periphery thereof. Therefore, the number of sewing operation steps and the sewing operation cost can be curtailed, which in turn contributes to reducing the number of manufacturing steps and the cost of manufacturing the air bags 11.

Figure 5:
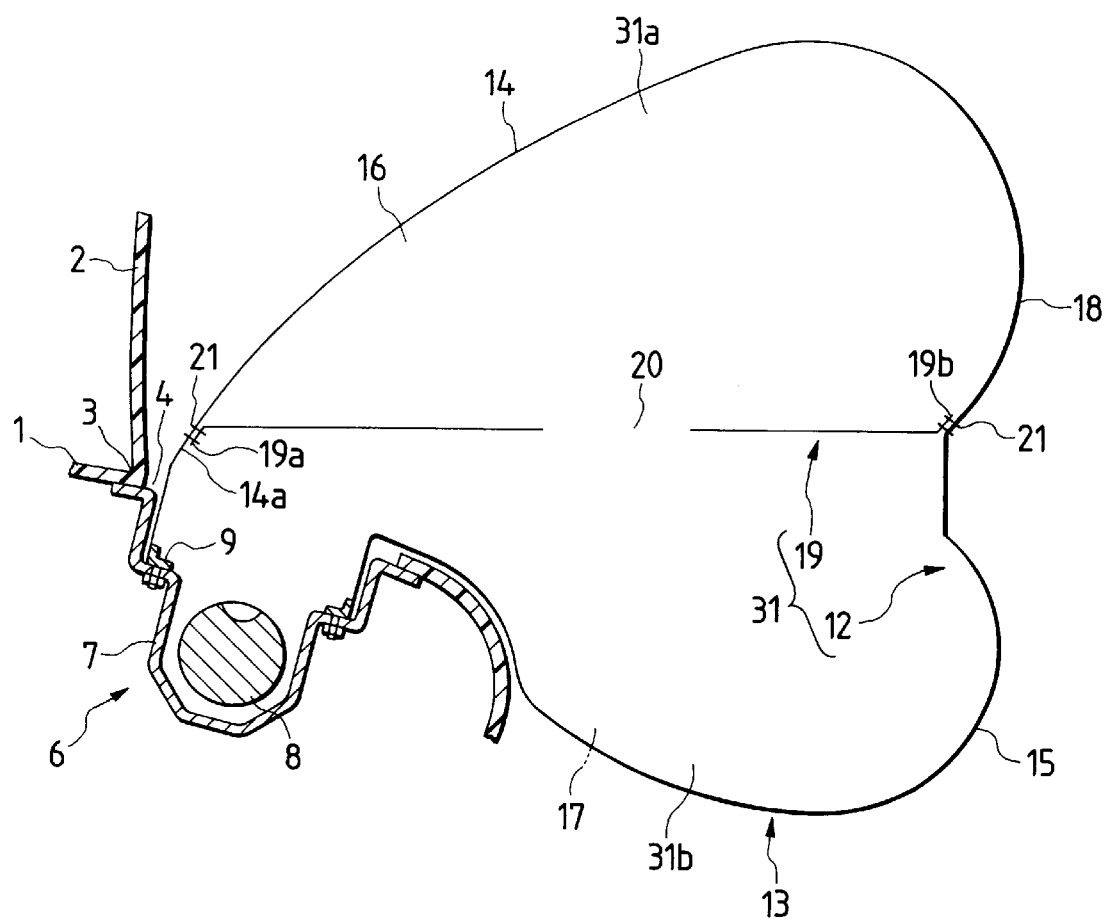
FIG. 5 is a sectional view of another embodiment of an air bag, according to the present invention, with the air bag inflated.
Figure 6:
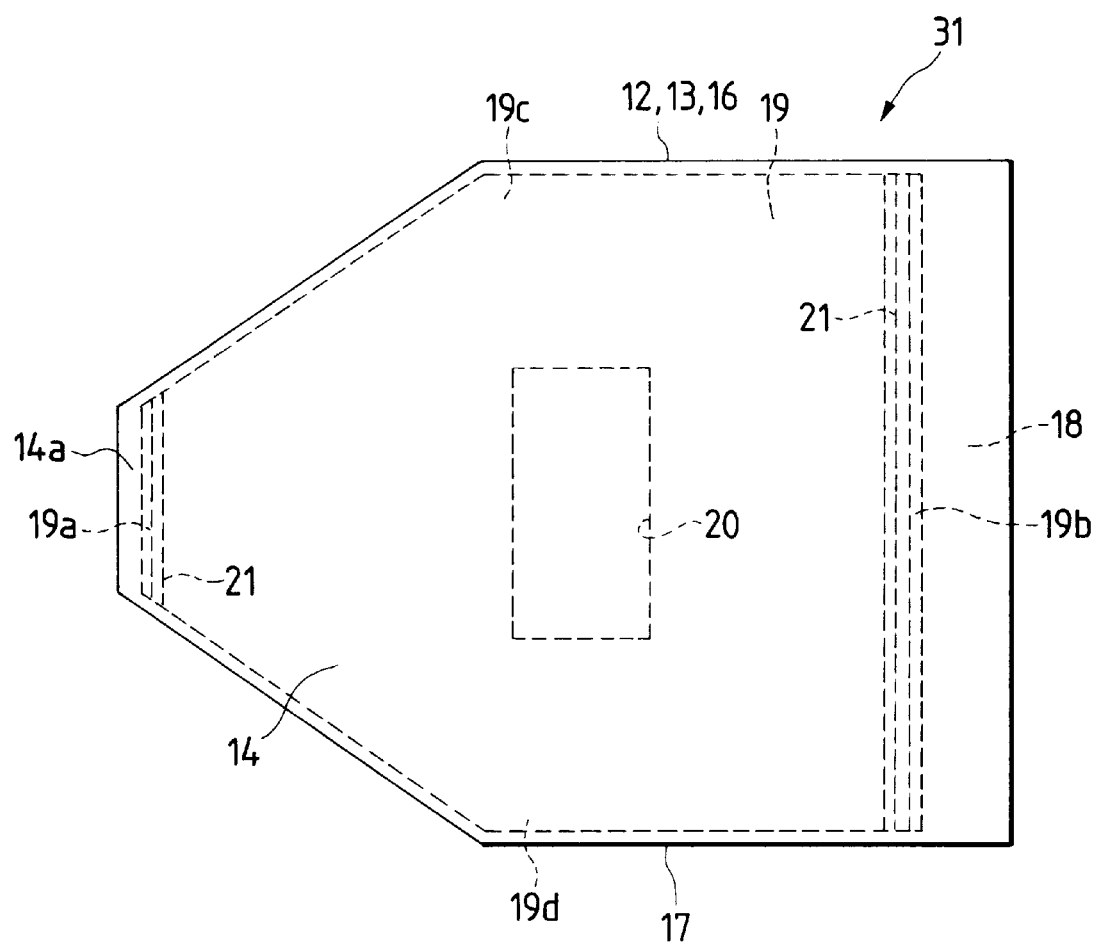
FIG. 6 is a plan view of the air bag embodiment shown in FIG. 5.

While the case where the front side end portion 19a of the sheet 19 is sewn to the front portion 15a adjacent the peripheral edge of the opening 12a in the lower side wall portion 15 of the circumferential wall portion 13 of the air bag main body as in the first embodiment, the front side end portion 19a may be sewn to a front portion 14a adjacent the peripheral edge of the opening 12a in an upper side wall portion 14 with the sewing yarn 21 in such a manner that an air bag 31 is split into an upper chamber 31a and a lower chamber 31b as shown in FIGS. 5 and 6.

Further, while the case where the air bag main body 12 is split into two chambers by taking advantage of a single sheet 19 has been presented in the air bags 11, 31 in the aforementioned modes of embodiment, the air bag main body may be split into three chambers by taking advantage of a plurality of sheets 19, each sheet 19 having only the front side end portion 19a and the rear side end portion 19b sewn to the peripheral edge of the opening 12a and to the bottom wall portion 18.

Still further, while the case where the air bags 11, 31 applied to the air bag apparatus 6 for the passenger's seat have been presented in the aforementioned modes of embodiment, the air bag of the present invention may be applied to air bag apparatuses for other passenger seats and the like.

What is claimed is:

1. An air bag for an air bag apparatus comprising:

a sac-like air bag main body having a circumferential wall portion and a bottom wall portion defining an interior space, said circumferential wall portion extending in a sleeve-like form from a peripheral edge defining an opening and including side wall portions arranged on upper, lower, left, and right sides of the main body, said bottom wall portion closing said circumferential wall portion;

said air bag main body including (i) a single piece of fabric forming the upper, lower, and bottom wall portions, and (ii) two separate pieces of fabric respectively forming the left and right side wall portions, said two separate pieces of fabric being sewn to opposite edges extending about the single piece of fabric;

an interiorly positioned sheet attached and arranged to extend between a portion of the peripheral edge defining the opening and said bottom wall portion in such a manner that the interior of said air bag main body is split into a plurality of chambers, said sheet having a communicating hole formed therein; and wherein said sheet is unconnected to said left and right side wall portions.

2. The air bag for an air bag apparatus according to claim 1, wherein said sheet includes a front side end portion and a rear side end portion respectively positioned at a front portion of the peripheral edge of said opening and said bottom wall portion, said front side end portion being sewn to the peripheral edge of said opening and said rear side end portion being sewn to said bottom wall portion.

3. The air bag for an air bag apparatus according to claim 2, wherein the air bag main body is split into more than two chambers by a plurality of sheets, each sheet having only the front side end portion and the rear side end portion sewn to the peripheral edge of the opening and the bottom wall portion.

4. An air bag for an air bag apparatus according to claim 1, wherein a folded air bag is disposed on an upper portion of an instrument panel, and a front side end portion of said sheet is sewn to a rear side portion of the peripheral edge of said opening.

5. The air bag for an air bag apparatus according to claim 5, wherein said sheet is attached adjacent said lower side.

\* \* \* \* \*